July 3, 1934.   N. P. BECK   1,964,713
ILLUMINATED DISPLAY CASE
Filed July 18, 1931
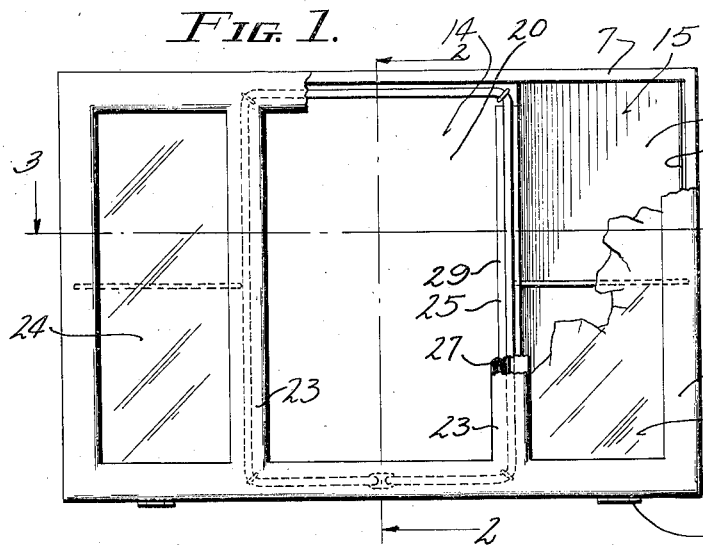
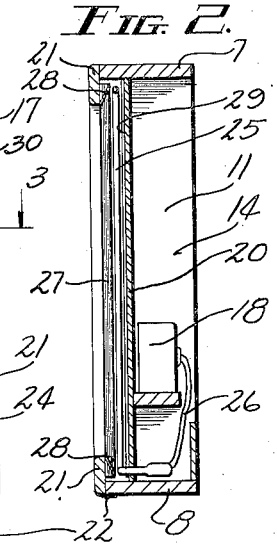
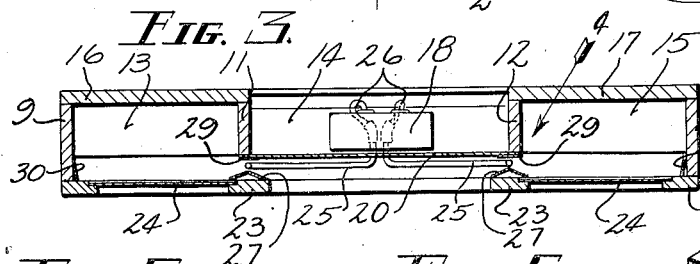
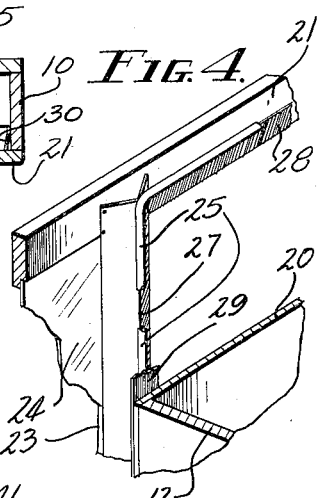
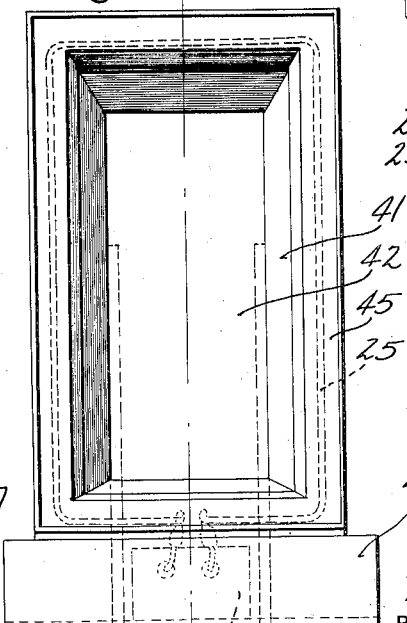
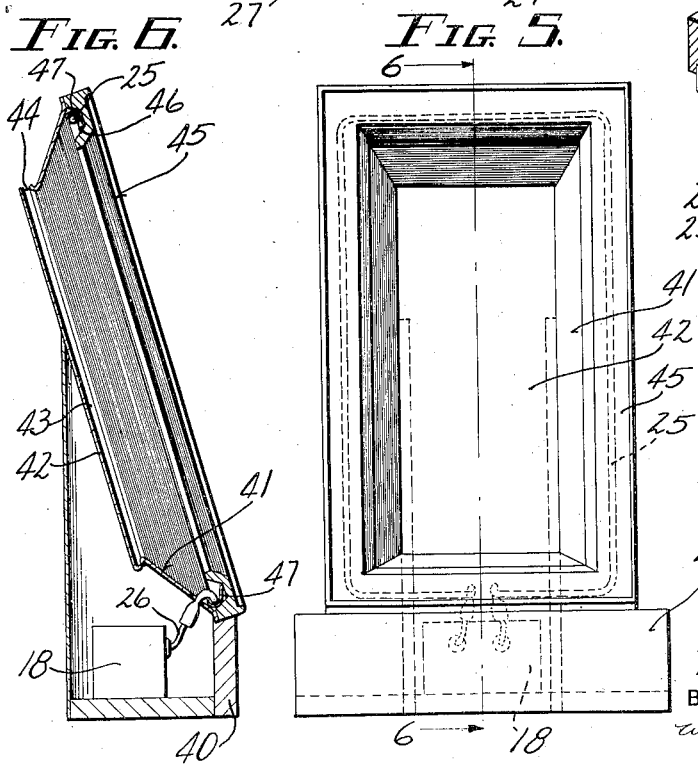
INVENTOR
Nicholas P. Beck
BY
Wheeler, Wheeler & Wheeler
ATTORNEYS Patented July 3, 1934

1,964,713

UNITED STATES PATENT OFFICE 1,964,713

ILLUMINATED DISPLAY CASE

Nicholas P. Beck, Lansing, Mich.

Application July 18, 1931, Serial No. 551,675

10 Claims. (Cl. 40—130)

This invention relates to improvements in illuminated display cases.

It is the primary object of the invention to provide for the uniform illumination of a bulletin or advertising placard in a display case of relatively shallow depth, the source of illumination being concealed. I propose to accomplish this result through the use of a concealed source of illumination which is practically continuous about the surface to be illuminated, and the light of which is controlled by suitable reflectors which, because of the character of the light source, may be confined to an extremely limited space. The source of illumination preferably comprises a so-called "discharge tube" in the form of an elongated tube of small cross section filled with neon or some other gas productive of the desired color of illumination.

Further objects of the invention relate to the provision of suitable space for housing the electrical equipment necessary for the functioning of a discharge tube as used in accordance with this invention, and to the mechanical organization of each of the several structures herein disclosed.

In one of these structures the same source of illumination used for the bulletin board or placard is also employed to illuminate a cupboard or set of shelves upon which small articles may be displayed.

In another device herein disclosed an attractive frame concealing the source of illumination surrounds the surface to be illuminated, the frame and surface being supported at a desired inclination on a base which houses the electrical equipment.

Other advantages and objects will be apparent from the following disclosure.

In the drawing:

Figure 1 is a front elevation of a device embodying the invention, with a portion of its cover plate broken away to expose the disposition of the discharge tube comprising the source of illumination.

Figure 2 is a section taken in the plane indicated at 2—2 in Fig. 1.

Figure 3 is a section taken in the plane indicated at 3—3 in Fig. 1.

Figure 4 is a fragmentary detail in perspective viewing the parts shown in Fig. 2 in the direction indicated by the arrow marked 4.

Figure 5 is a front elevation of a modified device embodying the invention.

Figure 6 is a vertical section taken in the plane indicated at 6—6 in Fig. 5.

Like parts are identified by the same reference characters throughout the several views.

In the construction shown in Figs. 1 to 4 inclusive a case having a top wall 7, a bottom wall 8, and end walls 9 and 10, is provided with relatively shallow partitions 11 and 12 subdividing the interior of the case into three compartments 13, 14 and 15. The compartments 13 and 15 open forwardly and are closed at the rear by walls 16 and 17. The compartment 14 houses the transformer 18 or other electrical equipment and opens rearwardly, being closed at its front by the bulletin board 20 which provides the surface to be illuminated.

The front of the entire case may be closed by a door 21 hinged thereto at 22 and preferably subdivided by vertical frame bars at 23 registering with the partitions 11 and 12 within the case. The spaces between the frame bars and the door may be glazed or unglazed as desired. I have shown the door glazed at 24 to protect the contents of compartments 13 and 15 while the space between the bars is left wholly open so that vision of any subject matter on bulletin board 20 will be wholly unobstructed.

The bulletin board 20 is completely surrounded by a discharge tube 25, the ends of which are brought through the bulletin board 20 at its bottom and communicated by wiring 26 with the transformer 18. Carried by the door in registry with the discharge tube is a reflector which may conveniently be made of chromium or nickel plated metal. The portion of the reflector carried by the bars 23 of the door is best shown in Fig. 3 at 27 and is in the form of a shallow V with its convex apex registering exactly with the tube. Thus light from the tube is reflected not only to the bulletin board, but to the compartments 13 and 15.

The portion of the reflector carried by the top and bottom surfaces of the door is planiform as shown at 28 in Fig. 2, and is set at such an angle as to reflect the light of the tube downwardly on to the surface of the bulletin board. Additional reflecting surfaces may be used as desired. I have found it useful to employ a strip of reflecting material at 29 in line with the front margin of each of the partitions 11 and 12 as shown in Fig. 3. I also prefer to use about the entire peripheral surface of compartments 13 and 15, adjacent the door, an inclined reflector shown at 30.

It will be found that the discharge tube extending practically continuously about the bulletin board surface to be illuminated, gives a remarkably even distribution of light over the entire surface notwithstanding the closeness of the tube to the surface. In this respect the results obtained are distinctly different from and superior to any results obtainable heretofore in the use of electric lamps for surface illumination under similar conditions.

In the construction shown at Figs. 5 and 6 the device is used for bulletin illumination only, no display case being provided for. A base 40 houses the transformer 18 and connections 26. Supported at an angle by this base is a shallow case 41 having inwardly converging walls, as clearly shown in the drawing. Immediately adjacent the back 42 of the case is a guide groove 43 which is continuous about the case except that the top of the case is open at 44 to receive a poster or bulletin card which may be introduced into the case through the slot thus provided.

The front of the case is bordered by a frame 45 made of molding having an interior channel at 46 sufficiently deep to receive the discharge tube 25 and a reflector 47 which has a portion concentric with the tube, and a substantially planiform portion in channel 46 which is adapted to distribute light at an infinite number of angles across the surface to be illuminated.

The inclined side margins of case 41 between the source of illumination and the surface to be illuminated, are preferably painted a dead black. This gives an appearance of great depth to the case or frame in which the bulletin is displayed. Within this dead black border a bulletin card, uniformly illuminated by the continuous discharge tube about its periphery, stands out vividly. When no separate card is introduced through slot 44 it will be obvious that the forward surface of the back member 42 of case 41 will comprise the surface to be illuminated and may be decorated as desired.

I claim:

1. In a device of the character described, the combination with a surface to be illuminated, of an electrical illumination tube extending on all sides of the space in front of said surface, a casing having a tube housing in the paths of substantially all light rays other than those intercepted by said surface, and a reflector within the housing having planiform portions inclined from said tube inwardly and away from said surface to intercept light rays directed toward the housing and reflect them along divergent lines in the direction of said surface.

2. In a device of the character described, the combination with a surface to be illuminated and a discharge tube extending substantially continuously about the space in front of said surface, of a casing enclosing said tube on all sides except that through which rays of light pass directly from the tube to said surface, and a reflector within the tube-concealing portions of the casing, said reflector having planiform portions inclined from said tube inwardly and away from said surface to intercept rays of light directed toward the casing and reflect them divergently toward the surface to be illuminated, said planiform portions of the reflector being so disposed within the housing as to provide for a substantially uniform illumination of said surface in cooperation with the direct rays of light passing from the tube to said surface.

3. In a device of the character described, the combination of a case subdivided into compartments one of which opens forwardly and one of which opens rearwardly and is provided at its front with a closure having a forwardly exposed surface to be illuminated, illuminating means disposed about the periphery of said surface and a reflector concealing said illuminating means and apertured to expose said surface, the portion of the reflector between said surface and the forwardly opening compartment of the case being formed to reflect some light toward said surface and some toward said compartment.

4. In a device of the character described, a case subdivided into three compartments of which two open forwardly and an intermediate compartment opens rearwardly, a cover for said case provided with openings, a surface to be illuminated in front of said intermediate compartment, illuminating means disposed about the periphery of said intermediate compartment, connections therefor extending into said compartment, and reflecting means carried by said cover and associated with said illuminating means in the closed position of the cover.

5. In a device of the character described, the combination with a base and a transformer housed therein, of a casing mounted thereon and provided at its back with a surface to be illuminated, a frame at the front of said casing surrounding said surface and provided interiorly with a channel, light absorbent side walls extending between the front and back of said casing, a substantially continuous discharge tube concealed within said channel, and connections therefrom to said transformer.

6. In a device of the character described, the combination with a base and a transformer housed therein, of a casing mounted thereon and provided at its back with a surface to be illuminated, a frame at the front of said casing surrounding said surface and provided interiorly with a channel, light absorbing side walls spacing said frame from said surface, a substantially continuous discharge tube concealed within said channel, and connections therefrom to said transformer, said case being slotted for the reception of a card on the surface to be illuminated.

7. In a device of the character described, the combination with a base and a transformer housed therein, of a casing mounted thereon and provided at its back with a surface to be illuminated, a frame at the front of said casing surrounding said surface and provided interiorly with a channel, a substantially continuous discharge tube concealed within said channel, and connections therefrom to said transformer, said case having light absorbent side walls inclined toward the surface to be illuminated.

8. A device of the character described, comprising a base, a transformer mounted therein, a casing slightly rearwardly inclined upon said base and provided with a back wall constituting a display surface, side walls inclined toward said back wall and made of light absorbent material, an interiorly channeled frame mounted on said side wall, and a discharge tube substantially continuous about said frame and connected with said transformer for the uniform illumination of the display surface of the case.

9. The combination with a casing adapted to support a display card and having a marginal forwardly and inwardly extending housing wall substantially surrounding the space in front of the card, of reflecting means concealed in said forwardly and inwardly extending wall, an electrical illumination tube interposed between the reflector and the card within said housing wall and concealed thereby, said reflecting means having planiform reflecting surfaces inclined from said tube inwardly and away from said surface to intercept rays of light emanating from said tube in directions other than that of the card, and to reflect the intercepted rays to the card, said planiform surfaces being disposed for distribution of the reflected rays over the face of the card in directions to cause such reflected rays to cooperate with the direct rays of light from the tube to produce the desired degree of illumination in all portions of the face of the card.

10. In a device of the character described, the combination of a casing providing a display surface to be illuminated and having a forwardly projecting housing portion extending substantially around the space in front of said surface and providing an opening for a direct view of said surface, an illuminating tube concealed within said housing, with the space between it and said surface open and unobstructed, and reflecting means interposed between the tube and the housing and inclined from said tube inwardly and away from said surface to reflect rays of light emanating from the tube in the direction of the housing divergently over said display surface to predetermine the relative degree of illumination of each portion of the surface resulting from the combined illuminating effect of the direct rays and the reflected rays.

NICHOLAS P. BECK.